United States Patent [19]

Moran

[11] Patent Number: 5,689,477
[45] Date of Patent: Nov. 18, 1997

[54] METHOD AND APPARATUS FOR STORING AND PRESENTING VISUAL AND AUDIBLE INFORMATION TO AN INDIVIDUAL

[75] Inventor: Richard P. Moran, Issaquah, Wash.

[73] Assignee: Visionary Technology, Limited, Hong Kong, China

[21] Appl. No.: 541,234

[22] Filed: Oct. 12, 1995

Related U.S. Application Data

[63] Continuation of Ser. No. 150,354, Oct. 29, 1993, abandoned.

[51] Int. Cl.$^6$ .................................................. H04B 1/20
[52] U.S. Cl. .............................. 369/4; 434/310; 600/28
[58] Field of Search ......................... 369/4, 5, 3; 360/18, 360/19, 20, 24; 434/308, 309, 310, 318, 321; 600/27, 28; 128/732, 745

[56] References Cited

U.S. PATENT DOCUMENTS

| | | | |
|---|---|---|---|
| 4,892,106 | 1/1990 | Gleeson, III | 600/27 |
| 4,902,274 | 2/1990 | Gleeson, III | 600/27 |
| 5,036,858 | 8/1991 | Carter et al. | 600/27 |
| 5,274,618 | 12/1993 | Henmi et al. | 369/4 |
| 5,306,228 | 4/1994 | Rubins | 600/27 |

OTHER PUBLICATIONS

Process For Imparting Knowledge, PCT/EP91/00487, Oct. 3$^{rd}$, 1991.
Isaacs: "Recent Studies in Sound and Light", Megabrain Report, vol. 2 No. 2, 1993, p. 9.
Harrah–Conforth: "Alpha and Theta Response to the Mind's Eye Plus", Doctoral Dissertation, Indiana U., 1990.
Gellhorn et al.: "Mystical States of Consciousness: Neurophysiological and Clinical Aspects", 1972.
Nideffer: "Alpha and the Development of Human Potential", 1973.
Williams et al. "EEG Responses to Photic Stimulation in Persons Experience at Meditation" (1975).

Bancroft "Suggestology and Suggestopedia: The Theory of the Lozanov Method", 1976.
West: "Creativity, Altered States of Awareness, and Artificial Intelligence", 1976.
Martindale: "Creativity, Consciousness, and Cortical Arousal", 1977.
Hebert et al.: "Theta Bursts: An EEG Pattern in Normal Subjects Practicing the Transcendental Meditation Technique" (1977).
Budzynski: "Tuning In On the Twilight Zone", Aug., 1977.
Blum: "A conceptual Model for Hypontoic Alternations of Consciousness", 1978.
Stanton: "The Lozanov Method for Accelerating the Learning of Foreign Languages", Nov., 1978.

(List continued on next page.)

Primary Examiner—Tan Dinh
Attorney, Agent, or Firm—Craine & Jackson, P.S.

[57] ABSTRACT

A method and apparatus for storing and presenting visual and audible information to an individual. Audio source signals from a stereophonic audio source are processed by a microcontroller-controlled circuit that also receives commands from a programmer. The programmer commands cause the generation of pulsed low audio frequency control signals for each channel. The audio source signals are processed so that their frequencies are translated above the low audio frequency range of the pulsed control signals and inverted. The pulsed control signals are then added to the corresponding processed audio source signals to produce two combined audio signals which are then recorded on a compact disc. To replay the recorded information, the recorded combined audio signals are read from the compact disc. The pulsed control signals and processed audio source signals are separated by filtering and the processed audio source signals are reprocessed to recreate the original audio source signals. The pulsed control signals drive separate channel LED displays built into a headset visor and the audio source signals are concurrently played through speakers in the headset. Also disclosed is a method for using the apparatus so that the individual can learn information.

12 Claims, 6 Drawing Sheets

OTHER PUBLICATIONS

Joiner: "Listening from the Inside Out", 1984.

Eggers: "Suggestodpedia: An Innovation in Language Learning", Dec., 1984.

Belanger: "Suggestopaedia and Teacher Training", Jan., 1985.

Glicksohn: "Photic Driving and Altered States of Consciousness: An Exploratory Study", 1986.

Moon et al.: "A Meta–Analysis of Suggestopedia, Suggestology, Suggestive–accelerative Learning and Teaching (SALT) and Super–learning", Apr., 1986.

Marcum: "Lozanov's Suggestopedy: A Psycholinguistic Analysis of Its Theory and Praxis", Jun. 23, 1987.

Harding: "The Relationship Between Music and Language Achievement in Early Childhood", Apr., 1989.

Shealy: "Report of Brain Mapping with the Shealy Relaxmate", Jul., 1991.

Richardson et al.: "The effects of photic stimulation and private self–consciousness on the complexity of visual imagination imagery", 1990.

Shealy: "The Effects of the Shealy Relaxmate System Upon Stress, Mental Alertness, and Sleep", Aug., 1991.

Rauscher et al.: "Music and Spatial Task Performance", Oct. 14, 1993.

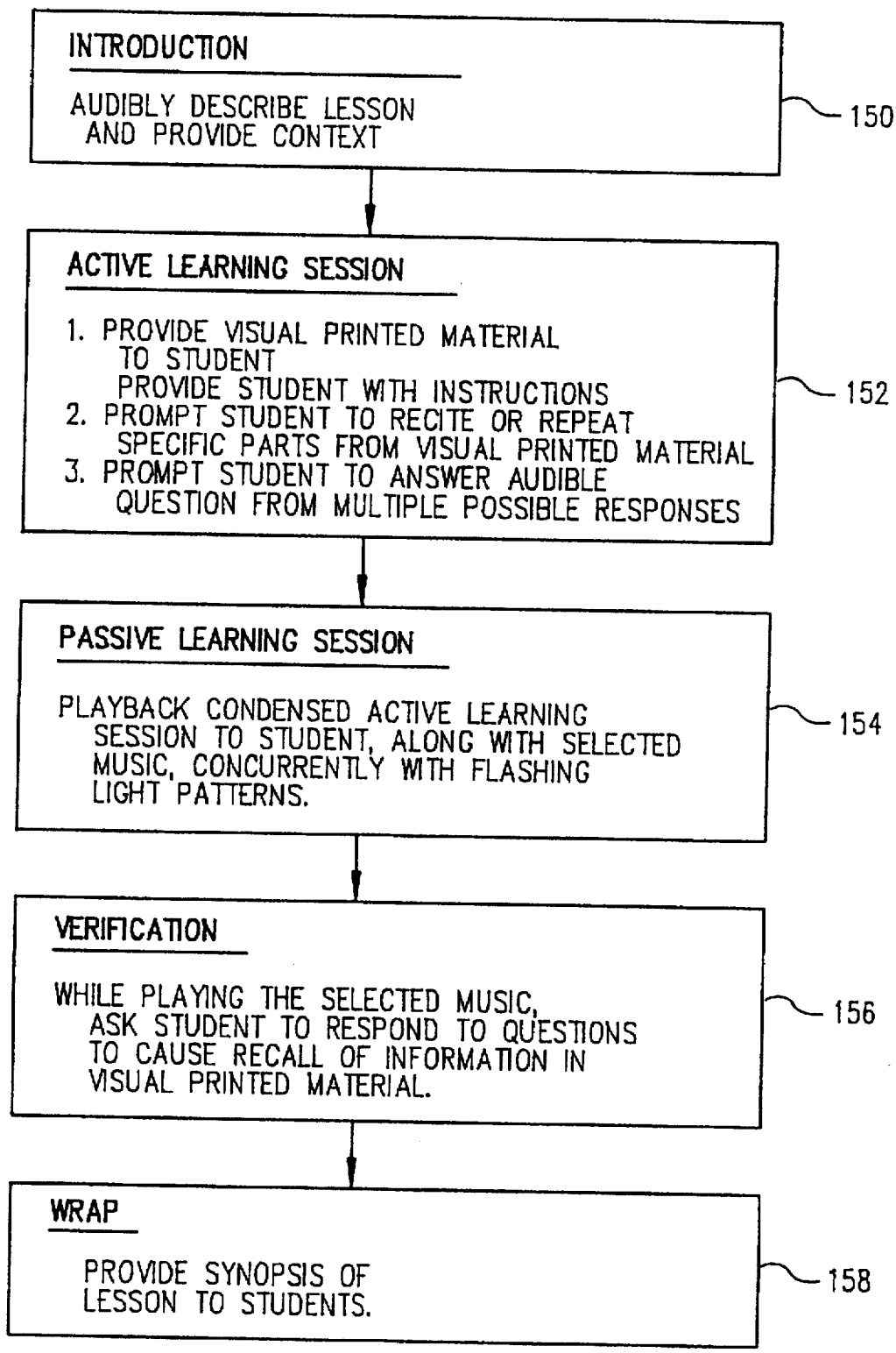

METHOD AND APPARATUS FOR STORING AND PRESENTING VISUAL AND AUDIBLE INFORMATION TO AN INDIVIDUAL

This application is a continuation of application Ser. No. 08/150,354, filed Oct. 29, 1993 abandoned, the benefit of the filing dates of which are hereby claimed under 35 USC 120.

TECHNICAL FIELD

The present invention relates to systems for presenting information to an individual, and more particularly, to a method and apparatus for storing and presenting visual and audible information to an individual.

BACKGROUND OF THE INVENTION

As electronics has advanced With improved microprocessors and other integrated circuit technology, improved methods of communication and entertainment have become available. For example, advanced electronics are largely responsible for the advent of such entertainment systems as compact disc (CD) technology. CD technology depends heavily upon advanced signal processing techniques to both encode information which is to be stored on a CD as well as to decode and retrieve the recorded information. CDs have the obvious advantage of being capable of storing large quantities of digitized information securely and transportably as well as conveniently.

An important use of CD technology is in the entertainment field. Certainly CDs have become the predominant form in which music is sold to the consuming public. Therefore, the public has ready access to CD players. While such CDs store a great deal of music information for listening, it is possible to add other entertainment value to CDs. One possible way to add entertainment value is to provide visual entertainment which is coordinated with the audible entertainment. While it is well-known to provide visual-audible information coordination in motion pictures and video tapes, where the audible and visual tracks are kept separate, it is not well-known to do so in such a way that the audible and visual information are stored together on an audible track, such as on a CD.

There are applications which have the need to put the information on a CD in such a way that only qualified users can retrieve the information. In this way, quality of the information can be assured and unqualified users will be unable to access the information. While such security measures have been proposed in the past, it is particularly convenient to be able to apply the security measures in a simple way which need only be used to transform the information in the audio frequency range before it is encoded on the CD.

Research conducted by Dr. Georgi Lozanov, Dr. Jane Bancroft and others, has shown that students can increase their rate of learning and memory retention by as much as 300% when certain factors exist. These factors include: 1) the learning experience is interactive; 2) a specific musical formula is incorporated into the learning experience; and 3) the student is in a relaxed state of mind.

The research concerning accelerated learning is described in: "Suggestology and Outlines of Suggestopedy," by G. Lozanov, New York:Gordon and Breach, 1978; "Suggestology and Suggestopaedia: The Theory of the Lozanov Method," by W. J. Bancroft, *Journal of S.A.L.T.*, Vol. 1, No. 4 (Winter 1976); "Suggestive-Accelerated Learning: Adaptations of the Lozanov Method," by O. Caskey and M. Flake, Texas Tech. University, 1976; and "Toward a Theory for Research of Learning in an Altered State of Consciousness," by R. Benitez-Bordon and D. P. McClure, University of Iowa, 1974. It has been determined that music with a tempo of 60–70 beats per minute is most effective, and that music that is more tonal and less dissonant is preferable.

The research concerning inducing a relaxed state of mind using controlled patterns of repetitive light and sound frequencies is described in: "Brain Wave Synchronization (Photo-Stimulation) with the Shealy Relaxmate," by C. Shealy, Shealy Institute, 1990; "Photic Driving and Altered States of Consciousness: An Exploratory Study," by J. Glicksohn, *Imagination, Cognition and Personality*, 6, 167–182, 1986; and "The Effects of Photic Stimulation and Private Self-Consciousness on the Complexity of Visual Imagination Imagery," by A. Richardson and F. McAndrew, *British Journal of Psychology*, 81, 381–394, 1990.

SUMMARY OF THE INVENTION

According to one aspect, the invention is a method for recording one or more audio signals and one or more control signals onto a storage medium having a frequency response in a response frequency range. The one or more audio signals and the one or more control signals are recorded for subsequent retrieval from the storage medium. The method comprises the steps of a) transforming at least one of the one or more audio signals and at least one of the one or more control signals to produce a composite transformed audio signal occupying at least two distinct audio frequency ranges, the at least two distinct audio frequency ranges falling within the response frequency range of the storage medium, and b) recording the composite transformed audio signal on the storage medium.

According to another aspect, the invention is a method for retrieving an audio signal from an audio signal stored on a storage medium. The stored audio signal includes component audio signals occupying two distinct frequency ranges. The method comprises the steps of a) separating the component audio signal stored in one of the two distinct frequency ranges from the component audio signal stored in the other of the two distinct frequency ranges, and b) transforming the frequencies of the component audio signal occupying at least one of the two distinct frequency ranges to a playback frequency range, the playback frequency range being different from the one frequency range.

According to a still further aspect, the invention is an apparatus for recording an audio signal and a control signal onto a storage medium, for subsequent retrieval from the storage medium. The apparatus comprises means for transforming the audio signal and the control signal to produce a transformed composite audio signal occupying two distinct audio frequency ranges, the two distinct audio frequency ranges both falling within an audio response frequency range of the storage medium, and means for recording the transformed audio signal onto the storage medium.

According to yet another aspect, the invention is an apparatus for retrieving two audio signals from an audio signal stored on an optical storage medium, the stored audio signal occupying two distinct frequency ranges. The apparatus comprises means for transforming the stored audio signal into an analog signal occupying the two distinct frequency ranges, means for separating the audio signals stored in one of the two distinct frequency ranges from the audio signals stored in the other of the two distinct frequency ranges, and means for transforming the frequencies of the audio signals occupying at least one of the two distinct frequency ranges to a playback frequency range, the playback frequency range being different from the one frequency range.

BRIEF DESCRIPTION OF THE DRAWINGS

FIG. 7 is a flow chart of a method for use in accordance with the preferred embodiment of the second aspect of the present invention.

DETAILED DESCRIPTION OF THE INVENTION

Figure 1:
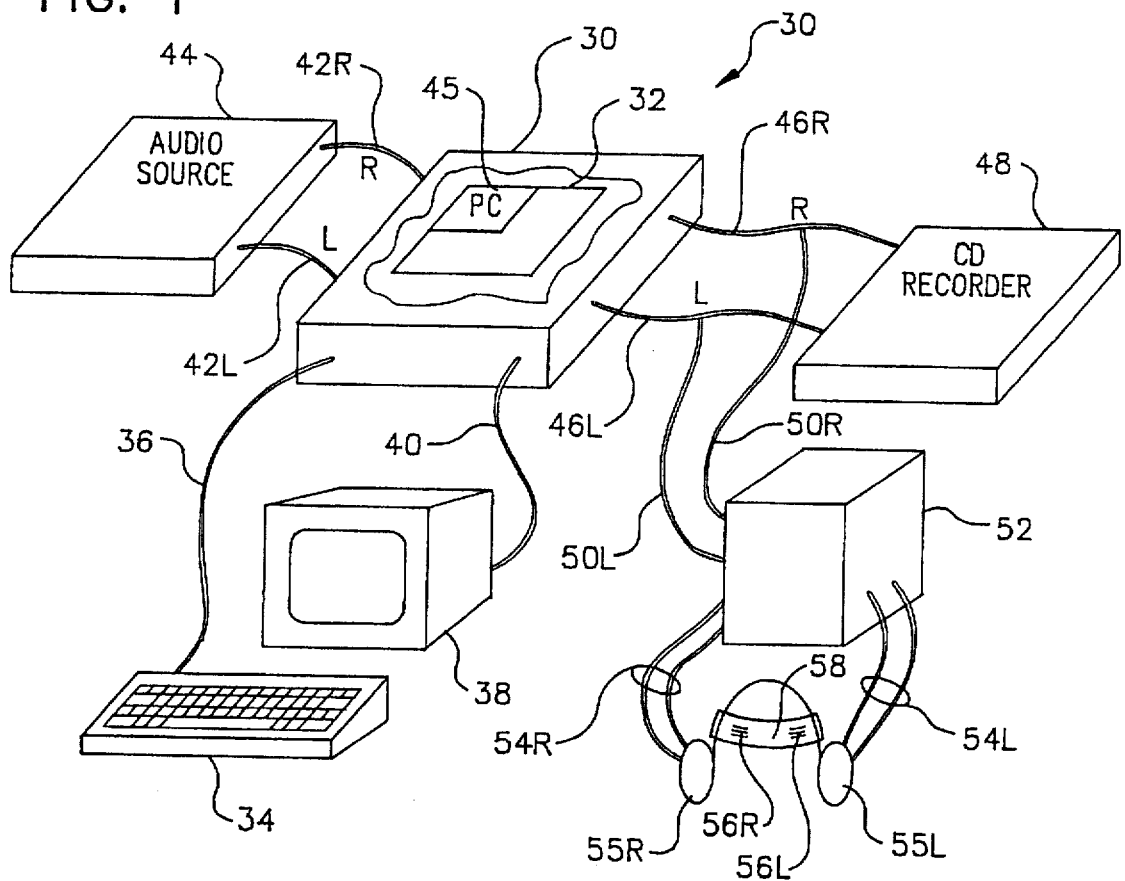
FIG. 1 is a schematic diagram of the preferred embodiment of a first aspect of the present invention.

FIG. 1 is a schematic diagram of the preferred embodiment of a first aspect of the present invention. A record apparatus 30 includes a processing circuit 32 that receives inputs such as commands from a programmer using a terminal 34 (including data and program memories and a keyboard), through the cable 36, and, in response to the inputs, produces visible displays on the display 38, through the cable 40, and processes signals that the record apparatus 30 receives. The record apparatus 30 receives audio signals through cables 42L and 42R from an audio source 44. In the case that the audio source 44 is a stereo source of audio signals, the cable 42L carries a left channel signal and the cable 42R carries a right channel signal.

The processing circuit 32 includes a microcontroller 45 which controls various functions of the circuit 32, including receiving and interpreting the commands from the terminal 34. The microcontroller 45 includes an Intel 80C51FA microprocessor and its associated support components. These include a 64 kilobyte flash memory for code storage, plus a 32 kilobyte static RAM for LED tone program storage. The circuitry 32 also includes a transparent latch used to hold the low-order address to the memory devices during the data portion of a bus cycle, as the microcontroller multiplexes address and data on these low-order address lines.

Also in the microcontroller 45 is a 75155 RS-232 driver/receiver (U15). This device provides interface to standard RS-232 levels for serial communications to the terminal 34. The 80C51's internal UART is used to perform serial data transfer. The serial data format is 9600 baud asynchronous data with eight data bits and one stop bit. No parity is employed.

The record apparatus 30 produces output audio signals on the cables 46L and 46R. In the case that the audio source 44 is a stereo source of audio signals, the cable 46L carries a left channel signal and the cable 46R carries a right channel signal. The audio signals in the cables 46L and 46R are passed to a compact disk recorder 48 which records the audio signals on a compact disk. Alternatively, the compact disk recorder 48 could be replaced by another audio signal recorder, such as a cassette recorder.

If desired, a programmer using the record apparatus 30 can monitor the performance of the recording process by transmitting the audio signals in the cables 46L and 46R by connecting first ends of cables 50L and 50R respectively to the cables 46L and 46R and connecting second ends of the cables 50L and 50R to a playback apparatus 52. The playback apparatus 52 is preferably built into the headset 58, although, for clarity, it is shown outside the headset 58 in FIG. 2. As will be discussed subsequently, the playback apparatus 52 processes the audio signals in the cables 46L and 46R to reproduce the original source audio material and to test other signals that can be generated by the programmer, as will also be discussed subsequently.

In the preferred embodiment, the playback apparatus 52 generates four audio signals. Two of the signals are reproductions of the left and right channel signals that are generated on the cables 42L and 42R on the audio source 44. The reproduced left channel signal is transmitted through one line in the cable 54L and the reproduced right channel signal is transmitted through one line in the cable 54R. The reproduced left and right channel signals are played audibly to the programmer through speakers 55L and 55R in the headset 58. Another line in the cable 54L carries an audio control signal that leads to a light-emitting diode (LED) display 56L on the left-hand side of a visor 59, which is shaped to be worn by a person, such as the programmer. Another line in the cable 54R carries an audio control signal that leads to a light-emitting diode (LED) display 56R on the right-hand side of the visor 59. The audio control signals cause the LED displays 56L and 56R to turn on and off as programmed by the programmer.

The programmer programs the record apparatus 30 by means of a conventional command set which allows control over the audio encoded LED information that is played on the headset 58. The record apparatus 30 is capable of storing a LED-tone program in a conventional memory, then mixing that program with an audio sound track as described above. Each command consists of a string of one or more ASCII characters followed by a carriage return.

The record apparatus 30 will respond to unrecognized or incorrectly formatted commands with a question mark (?).

The LED-tone program is loaded into the record apparatus 30 by the technician using a series of (S)et commands, each command describing one behavior. Each behavior consists of a frequency, phase and duration, and the entire program consists of a sequence of individual behaviors.

The (S)et command has the form:

S P FF DDDD, where P is a phase code, explained below, FF is the strobe frequency, from 0 to 15 Hz and DDDD is the duration in seconds from 1 to 9999. The phase code is defined as follows:

P=0—Left and right LEDs strobe in phase.

P=1—Left and right LEDs strobe out of phase.

Note that the command must be formatted precisely as shown, with one digit for phase, two digits for frequency and four digits for duration. The spaces separating the fields in the command are optional, but are recommended for readability.

Example:

```
S 0 03 0010
S 1 05 0020
S 0 00 0005
S 1 07 0010
S 0 09 0010
```

When this set of behaviors is programmed and executed on the record apparatus 30, it will result in a master which, when played back through the digital headset, will cause the LEDs to strobe in phase at 3 Hz for 10 seconds, then out of phase at 5 Hz for 20 seconds, then become dark (0 Hz) for five seconds, then strobe out of phase at 7 Hz for 10 seconds, then in phase at 9 Hz for 10 seconds.

The record apparatus 30 will support programs as long as 5000 lines; that is, a sequence of 5000 different behaviors.

Before beginning a new (S)et sequence, the technician must issue the (C)lear command to the unit to clear any existing program information currently in its buffer. This condition will also be attained by removing power from the record apparatus 30. The format of the (C)lear command is:

C.

The sequence of (S)et commands is then entered, followed by the (G)o command. Upon receipt of the (G)o command, the record apparatus 30 will begin mixing the programmed LED behavior with the scrambled audio as soon as audio is detected at the record apparatus 30 input port. The format of the (G)o command is:

G.

Entire programs, including the (C)lear and (G)o commands, can be stored in a computer file and downloaded to the record apparatus 30 via a terminal program. An example of such a program would be:

```
C
S 0 10 0030
S 1 10 0030
S 0 12 0090
S 1 12 0090
S 1 13 0120
S 1 14 0120
S 1 15 0120
G
```

Having received this entire sequence from the technician, either directly or from a file, the record apparatus 30 will begin mixing the program as soon as audio is detected on the record apparatus 30 input.

It is recommended that program information be generated in file form, and loaded as a unit to the record apparatus 30. This reduces the opportunity for error, and allows the technician the ability to edit the program before loading it, and to save the program for future reference.

Figure 2:
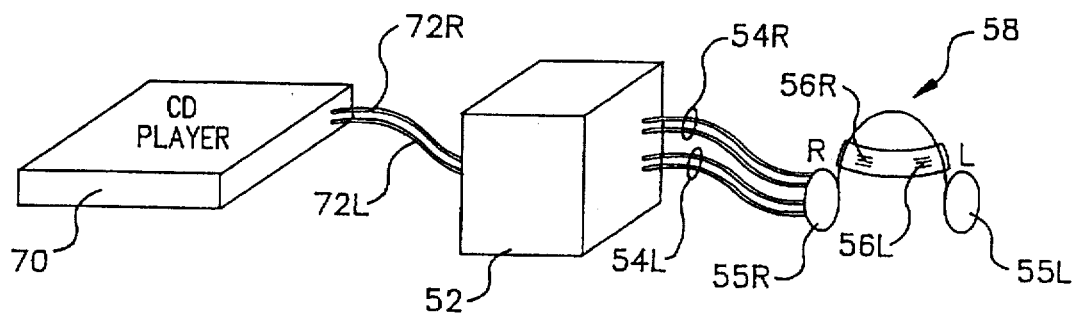
FIG. 2 is a schematic diagram of the preferred embodiment of a second aspect of the present invention.

FIG. 2 is a schematic diagram of the preferred embodiment of a second aspect of the present invention. A compact disc which has been recorded in accordance with the record apparatus 30 described in FIG. 1 is placed into a compact disc player 70. The compact disc player 70 produces left and right channel audio signals on cables 72L and 72R, respectively. The playback apparatus 52 described in FIG. 1 receives and processes the left and right channel audio signals to generate four audio signals. Two of the signals are reproductions of the left and right channel signals that were generated on the cables 42L and 42R (in FIG. 1) on the audio source 44 when the compact disc was recorded. The reproduced left channel signal is transmitted through one line in the cable 54L and the reproduced right channel signal is transmitted through one line in the cable 54R. The reproduced left and right channel signals are played audibly to the user through speakers 55L and 55R in the headset 58. Another line in the cable 54L carries the audio control signal that leads to the light-emitting diode (LED) display 56L on the left-hand side of the visor 59, which is worn by the user. Another line in the cable 54R carries the audio control signal that leads to the LED display 56R on the right-hand side of the visor 59. The audio control signals cause the LED displays 56L and 56R to turn on and off in conjunction with the audio signals produced by the audio source 44, as processed by the record apparatus 30.

Figure 3:
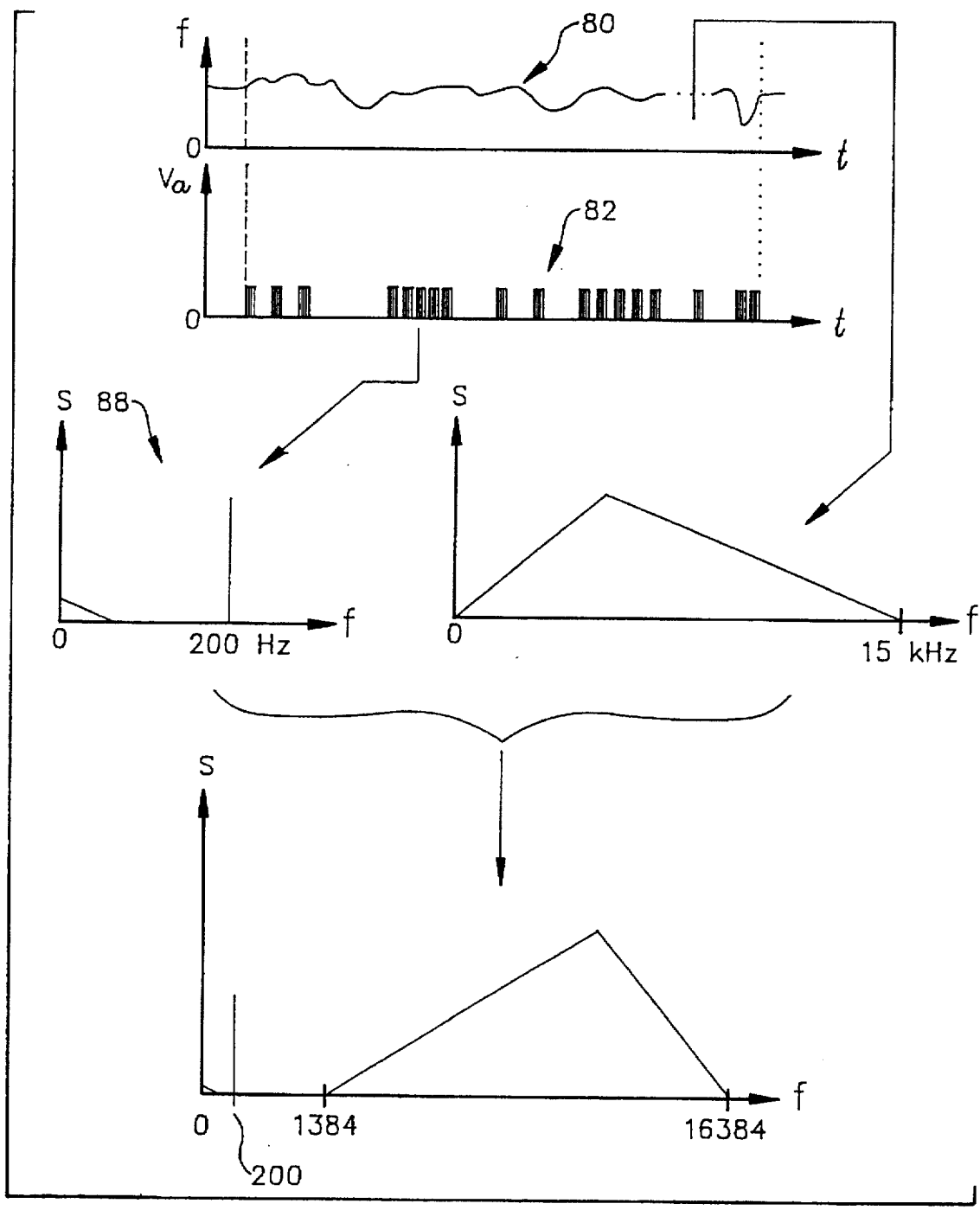
FIG. 3 is a schematic diagram of the signal processing in accordance with a preferred embodiment of the first aspect of the present invention.

FIG. 3 is a schematic diagram of the signal processing in accordance with a preferred embodiment of the first aspect of the present invention. FIG. 3 shows schematically how two audio signals 80 and 82 are combined by the preferred embodiment to produce the desired audio signals for recording. The audio signal 80 is typically one channel of a stereo signal, such as a stereo music signal. The audio signal 82 typically includes a series of pulses, each pulse comprising 5 cycles of a 200 Hz tone. Each pulse in the audio signal 82 causes the LED display 56 corresponding to that channel to light for a specific period of time, typically about 15 milliseconds. The pulses in a given channel are repeated at a repetition frequency, also determined by the programmer. The 200 Hz tones are filtered in the record apparatus 30 prior to mixing to remove any higher-order harmonics which might interfere with the audio sound track above 1384 Hz.

The pulses in both channels occur at the same repetition frequency, although the programmer can cause the pulses in one channel to be either in phase or 180 degrees out of phase with respect to the pulses in the other channel. Thus, the programmer determines the flashing frequency of the LED displays 56L and 56R and also whether the LED displays 56L and 56R flash synchronously, or out of phase. The time durations and the frequencies in the audio signal 82 are established by the programmer, as generally described in connection with FIG. 1.

The audio signal 80 has a spectral content as shown by the spectrum 86. The spectrum 86 shows that the audio signal 80 typically contains frequencies in the range of $f_0=0$ Hz to $f_2=15$ kHz. Similarly, the audio signal 82 has a spectral content as shown by the spectrum 88. The spectrum 88 shows that the audio signal 82 typically contains discrete frequencies in the range of $f_0$ 0 Hz to $f_1$ 200 Hz. As will be described subsequently, the two audio signals 80 and 82, having the spectra 86 and 88 are combined to produce an audio signal having a spectrum 90 ranging from $f_0$ to $f_h$, where $f_0 < f_1 < f_2 < f_h$. An audio signal having the spectrum 90 would have only the slightest resemblance to the audio signal 80. Accordingly, the audio signal having the spectrum 90 must be further processed to produce a signal that can be replayed on a CD player, such as CD player 70.

The spectrum 90 is related to the spectra 86 and 88 as follows. If the spectrum 86 is reversed in frequency and shifted upward by 1384 Hz, the result would be the high frequency portion of the spectrum 90. The low frequency portion of the spectrum 90 is the same as the spectrum 88.

Figure 4:
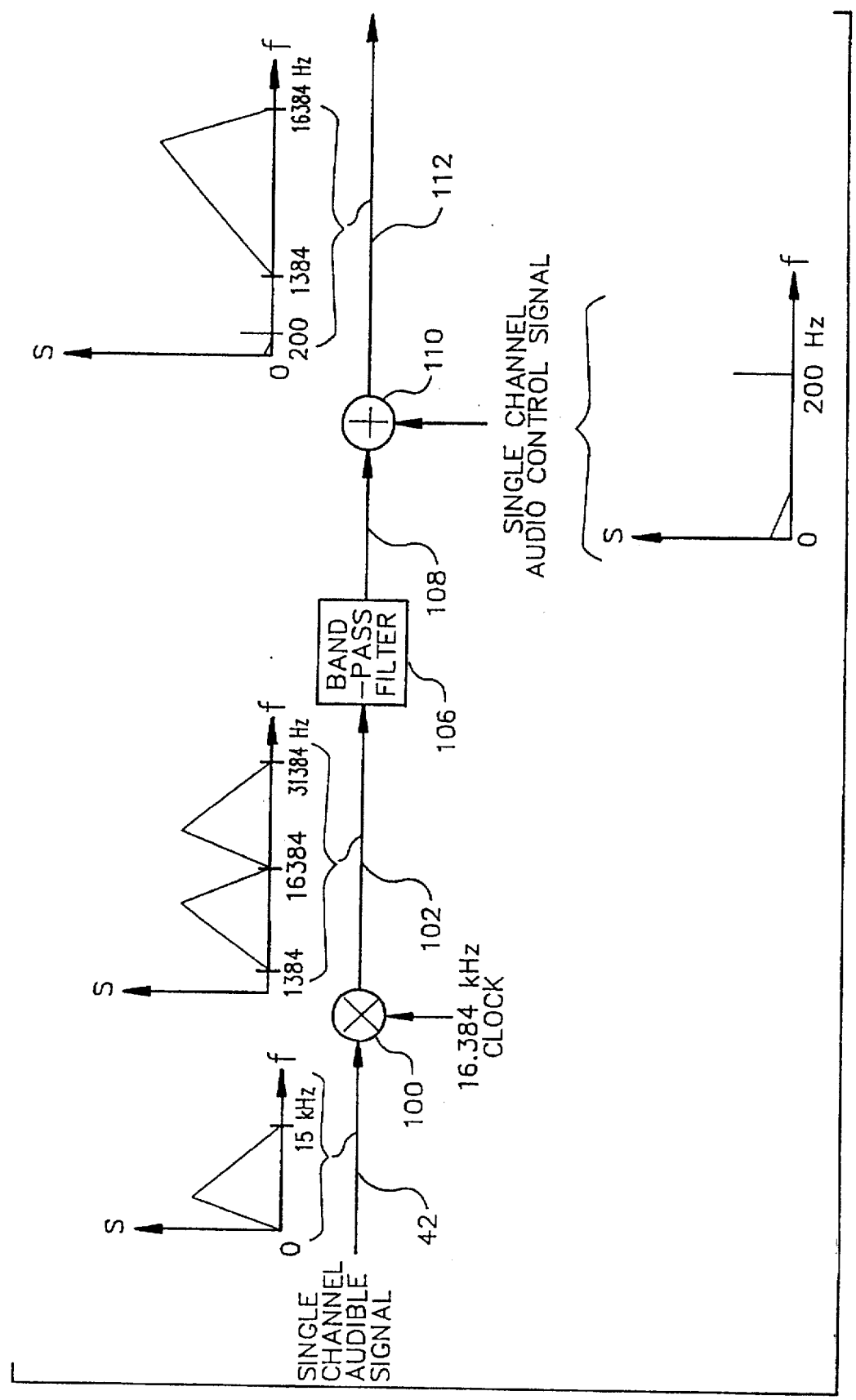
FIG. 4 is a block diagram of the signal processing in accordance with the preferred embodiment of the first aspect of the present invention.

FIG. 4 is a block diagram of the signal processing in accordance with the preferred embodiment of the first aspect of the present invention. The signals processing shown in FIG. 4 will accomplish the transformation of the spectra 86 and 88 in FIG. 3 to produce the spectrum 90. The audio signal from one channel of a stereo source, such as audio source 44 in FIG. 1 and having the spectrum, is received by the record apparatus 30 and mixed with a 16.384 kHz signal in a conventional doubly-balanced mixer 100. (The mixer 100 is similar to the mixer 134, which is discussed subsequently.) The result is an audio signal 102 having a spectrum 104 which is a mirror image reflection of the spectrum 86 about the 16.384 kHz frequency, after the spectrum 86 has been shifted upward by 16.384 kHz. The upper sideband portion of the spectrum 104 has the same shape as the original spectrum 86. The lower sideband portion of the spectrum 104 has the mirror image of the original spectrum 86. The spectrum 104 has no desired signal power below 1384 Hz, and a negligible amount exists in practice.

Next, the signal 102 is filtered in a filter 106 to produce an audio signal 108 whose spectrum corresponds to isolating the lower sideband of the spectrum 104. This is accomplished by suppressing the upper sideband of the spectrum 104. The filter 106 is a low-pass filter exhibiting a 4th-order Chebyshev response with a pass-band ripple of 0.5 dB. Next, the audio signal having the spectrum 88 is added to the audio signal 108 in a conventional analog summer 110 to produce the desired audio signal 112 which is output by the recording apparatus 30. The audio signal having the spectrum 88 is generated in response to control signals entered by the programmer, as shown in FIG. 1. The signals include 5-cycle 200 Hz tone bursts at a programmable repetition rate determined by the programmer. Their structure will be discussed subsequently.

The signal produced by each channel of the audio source 44 is processed separately, so that the two output audio signals produced by the recording apparatus 30 correspond to the two channels of the audio source 44. Accordingly, if the cable 42 in FIG. 4 is cable 42L, the audio signal 112 is audio signal 112L.

Figure 5:
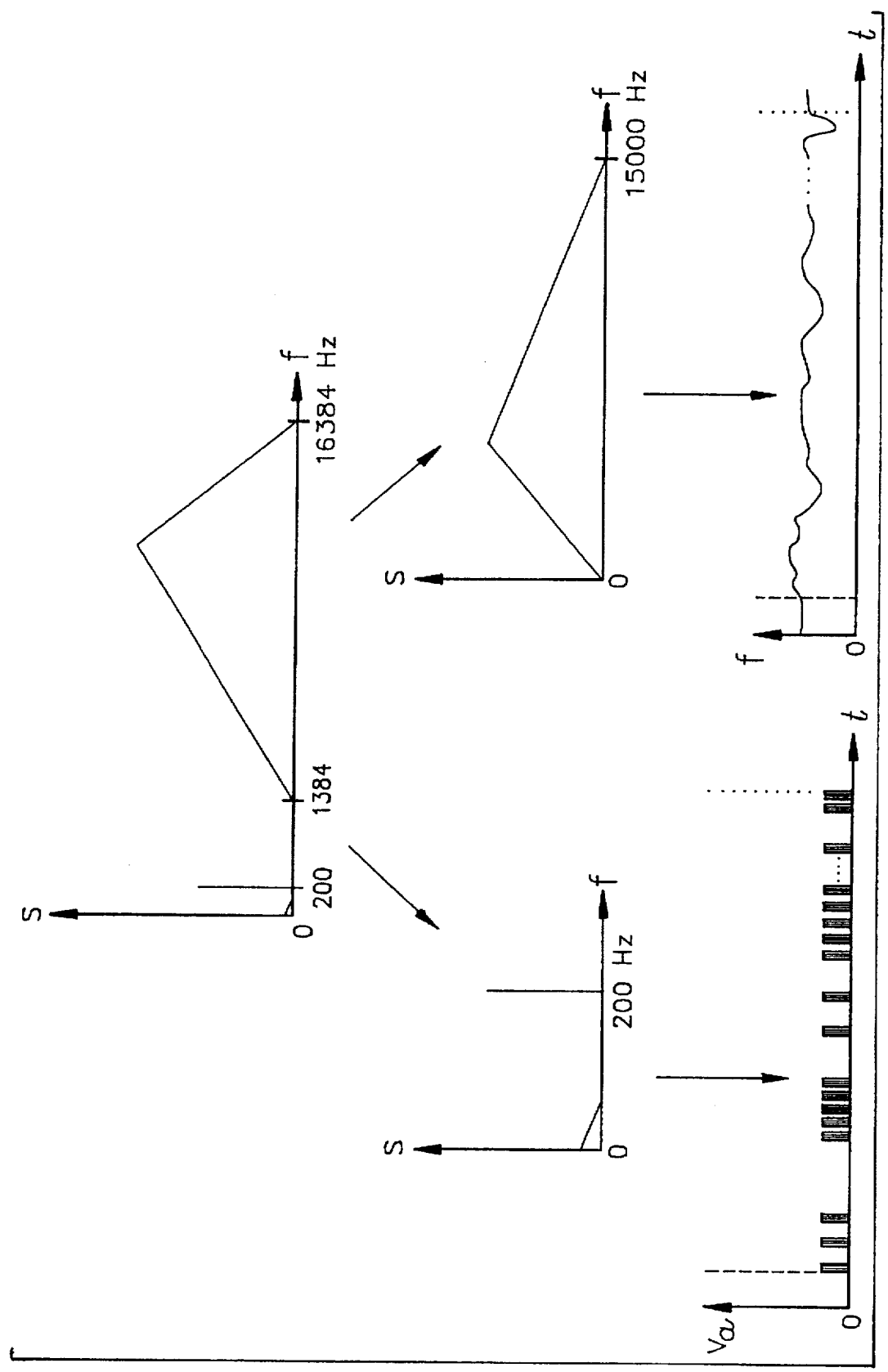
FIG. 5 is a schematic diagram of the signal processing in accordance with a preferred embodiment of the second aspect of the present invention.

FIG. 5 is a schematic diagram of the signal processing in accordance with a preferred embodiment of the second aspect of the present invention. The signal 112, having a corresponding spectrum 90, is processed to separate its lower frequency portion 114 from its upper frequency portion 116. The lower frequency portion 114 can be separated by filtering through a band pass filter to reproduce the spectrum 88. The upper frequency portion 116 of the spectrum is also further processed to reproduce the signal having the spectrum 86.

Figure 6:
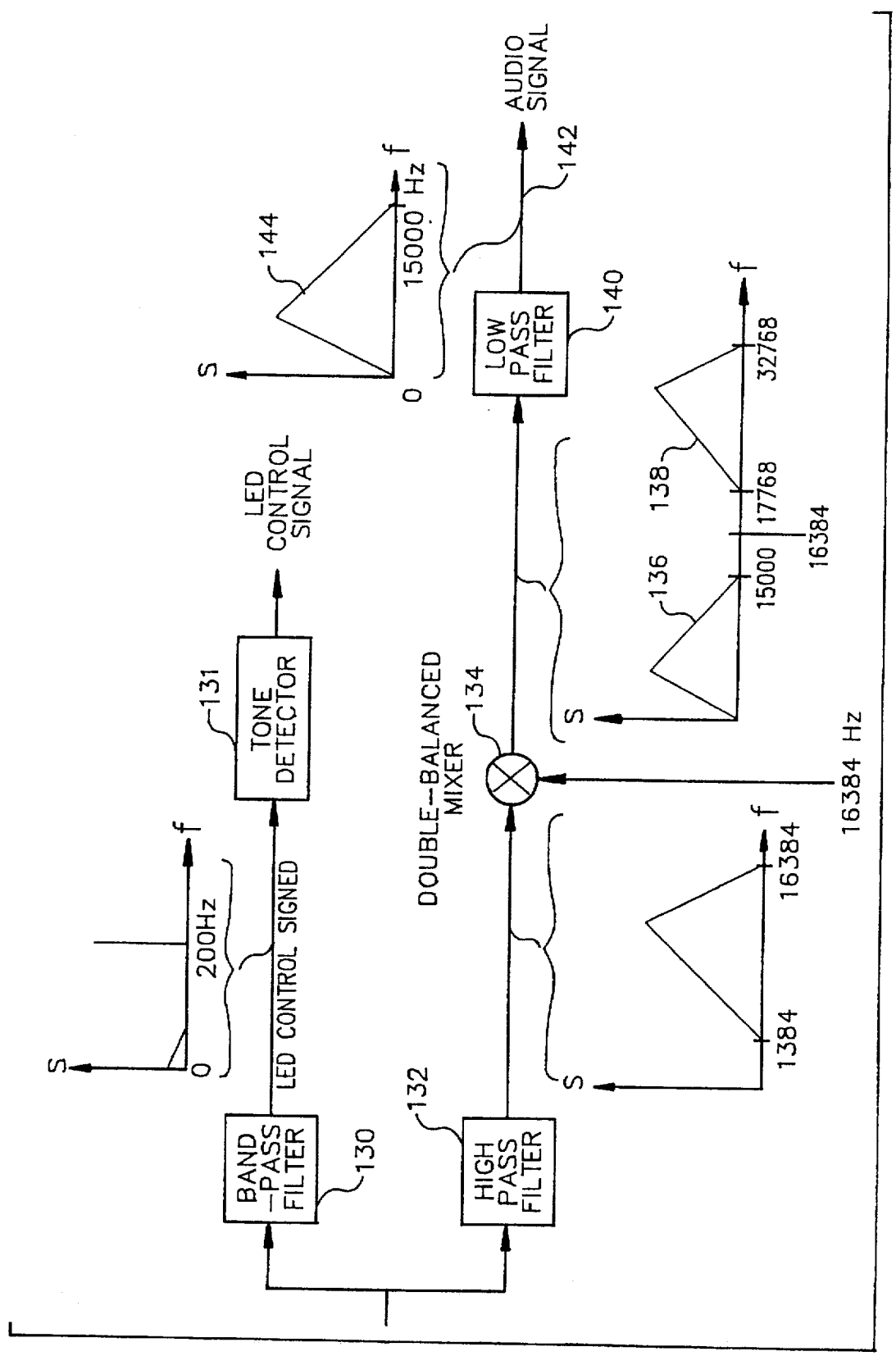
FIG. 6 is a block diagram of the signal processing in accordance with the preferred embodiment of the second aspect of the present invention.

FIG. 6 is a block diagram of the signal processing in accordance with the preferred embodiment of the second aspect of the present invention. The signal 112 is passed through a conventional bandpass filter 130 to extract the LED control signals. The LED control signals are then processed by an LED tone detector 131 which conventionally generates a short pulse of a duration of about 15 milliseconds in response to each pulse in the LED control signal. The LED tone detector 131 performs a peak-detection and comparison on the LED control signals. The LED control signals are used to trigger a monostable circuit which produces an output pulse in response to each pulse in the LED control signal. The monostable circuit pulses the base of a LED drive transistor in the appropriate LED display 56, which drives the LED very briefly (approximately 15 ms), but with a very high current (approximately 100 mA). This results in a LED pulse which is perceived as being very bright, but a low average power consumption. LED drive holding capacitors are charged at a low rate when the LEDs are off. When the LEDs are strobed, current is drawn through low-value resistors, discharging the holding capacitors through the LEDs.

The signal 112 is also passed through a high pass filter 132 to separate the upper frequency portion 116 of the spectrum from the lower frequency portion 114. The high pass filter 132 is a 5th order Chebyshev filter at 1384 Hz. The resultant signal 116 is then mixed in a doubly-balanced mixer 134 with a square wave signal at 16.384 kHz to produce a signal having a spectrum with two portions. The lower frequency portion 136 lies between 0 Hz and 15000 Hz and the upper frequency portion 138 lies between 17768 Hz and 32768 Hz. The upper frequency portion 138 is filtered out by a conventional low pass filter 140 to produce an audio signal 142 having a spectrum 144 that is substantially the same as the original signal spectrum 86 (see FIG. 3).

FIG. 7 is a flow chart of a method for use in accordance with the preferred embodiment of the second aspect of the present invention. In application, the preferred embodiment of the second aspect of the present invention can be used to enhance and accelerate learning in a student. In the method for use, the student is provided with an audible description of the lesson the student is to learn, and provided with a context for the lesson (block 150). Next, the method enters an active learning session (block 152). In this session, the student is provided with visual printed material, and with instructions for use of the visual printed material. Next, the student is prompted by a teacher or an automated system to recite or repeat specific parts from the visual printed material. Following this, the student is prompted by a teacher or an automated system to answer audible questions from multiple possible responses.

The method for using continues into a passive learning session (block 154). In the passive learning session, a condensation of the active learning session is audibly played back to the student, along with selected music which is played concurrently with flashing light patterns. Preferably, the condensed active learning session and selected music are mixed together to produce an audio track (or source Signal) that can be recorded on a CD, and control signals to control the rate and phase of the flashing lights produce a control signal that can also be recorded on the CD. Both of these processes are described in detail above. The method for using next enters a verification stage (block 156), in which the selected music played during the passive learning session is replayed while the student is asked to respond to questions designed to cause recall of information in the visual printed material. The replay of the selected music hastens the learning of the information, since the music accompanied the information during the passive learning session. Finally, in a wrap session (block 158), the student is provided with a synopsis of the lesson. If desired, the student can then be taken to block 150 again, in order to learn another lesson. Otherwise the learning session can be terminated.

While specific embodiments of various aspects of the present invention have been disclosed in the foregoing detailed description, those skilled in the art would appreciate modifications of the described embodiments which are within the scope of the present invention. Accordingly, the present invention is limited only by the following claims.

I claim:

1. A method for recording for subsequent retrieval at least one audio signal and at least one control signal onto a storage medium having a frequency response range from a low frequency $f_0$ to a high frequency $f_h$, wherein the at least one control signal has a frequency range of $f_0$ to $f_1$, and the at least one audio signal has a frequency range from $f_0$ to $f_2$, where $f_0 < f_1 < f_2 < f_h$, the method comprising steps of:

a) transforming the at least one audio signal and the at least one control signal to produce a composite transformed signal occupying at least two distinct audio frequency ranges that both fall within the response frequency range $f_0$ to $f_h$ of the storage medium, said at least two distinct audio frequency ranges include a lower composite transformed frequency range from $f_0$ to $f_1$, and an upper composite transformed frequency range from a value > $f_1$ to $f_h$;

b) recording the composite transformed audio signal on the storage medium; and c) the step of transforming the at least one audio signal causing the frequency range occupied by the transformed at least one audio signal to be shifted and inverted, so that the frequency $f_0$ of the at least one audio signal is transformed to approach a high end $f_h$ of the upper composite transformed frequency range and the frequency $f_2$ of the at least one audio signal is transformed to approach said value>$f_1$ at a low end of the lower composite transformed frequency range.

2. The method of claim 1, wherein the at least one control signal has a relatively narrowband compared to the least one audio signal, and step a) further including transforming the narrowband control signal into a transformed narrowband control signal occupying said lower composite transformed frequency range and transforming the at least one audio signal into a transformed analog signal occupying said upper composite transformed frequency range that is wider than said lower composite transformed frequency range, the highest frequency of the transformed narrowband control signal being lower than the lowest frequency of the transformed analog signal.

3. The method of claim 2, wherein the narrowband control signal has a narrowband control signal frequency range and the transformed narrowband control signal frequency range is identical to the narrowband control signal frequency range.

4. The method of claim 3, wherein the transformed analog signal frequency range is equal in width to the frequency range of the audio signal.

5. An apparatus for recording an audio signal and a control signal onto a storage medium, for subsequent retrieval from the storage medium, the apparatus comprising:

means for transforming the audio signal and the control signal to produce a composite transformed signal occupying at least first and second distinct audio frequency ranges, the at least first and second distinct audio frequency ranges falling within an audio response frequency range of the storage medium; and means for recording the transformed signal onto the storage medium wherein the control signal occupies a frequency range from a lower frequency limit $f_0$ to a relatively higher frequency limit $f_1$, and the signal occupies a frequency range from a lower frequency limit $f_0$ to a higher frequency limit $f_2$ and the composite transformed signal occupies a transformed frequency range from a lower transformed frequency $f_0$ to a high transformed frequency limit $f_h$, where $f_0 < f_1 < f_2 f_h$, the means for transforming the audio signal further causing the frequency range occupied by the audio signal to be inverted and shifted, so that the lower frequency limit $f_0$ of the audio signal is transformed into the second distinct audio frequency range of the composite transformed signal approaching $f_h$ and the high frequency limit $f_2$ of the audio signal is transformed so as to reside at a lower limit of said second distinct audio frequency range and above frequency $f_1$.

6. The apparatus of claim 5, wherein the control signal is a relatively narrowband compared to said audio signal, the means for transforming further transforming the narrowband control signal into a transformed narrowband control signal occupying said first distinct audio frequency range and transforming the audio signal into a transformed analog signal frequency occupying said second distinct range that is relatively wider than the transformed narrowband control signal frequency range, the highest frequency $f_1$ in the transformed narrowband control signal frequency range being lower than the lowest frequency in the transformed analog signal frequency range.

7. The apparatus of claim 6, wherein the narrowband control signal has a narrowband control signal frequency range and the transformed narrowband control signal frequency range is identical to the narrowband control signal frequency range.

8. The apparatus of claim 7, wherein the transformed analog signal frequency range is equal in width to the frequency range of the audio signal.

9. An apparatus for recording an audio signal and a second signal into a storage medium, for subsequent retrieval from the storage medium the apparatus comprising:

a signal processor to transform the audio signal and the second signal to produce a transformed signal occupying first and second distinct audio frequency ranges both falling within an audio response frequency range of the storage medium; and a recorder to record the transformed signal on the storage medium wherein the second signal occupies a frequency range from a lower frequency $f_0$ to a higher frequency $f_1$, the audio signal occupies a frequency range from said lower frequency $f_0$ to an even high frequency $f_2$, and the transformed signal occupies a transformed frequency range from a lower transformed frequency $f_0$ to an upper transformed frequency $f_h$ where $f_0 < f_1 < f_2 < f_h$, the signal processor further causing the frequency range occupied by the audio signal to be inverted and shifted, so that the lower frequency $f_0$ of the audio signal is transformed into the upper transformed frequency $f_h$ and the frequency $f_2$ of the audio signal is transformed into a relatively lower portion of said second distinct audio frequency range of said transformed signal above said frequency $f_1$.

10. The apparatus of claim 9, wherein the second signal is a narrowband control signal and the audio signal is an analog signal, the signal processor further transforming the narrowband control signal into a transformed narrowband control signal frequency range and transforming the analog signal into a transformed analog signal frequency range that is relatively wider than the transformed narrowband control signal frequency range, the highest frequency in the transformed narrowband control signal frequency range being lower than the lowest frequency in the transformed analog signal frequency range.

11. The apparatus of claim 10, wherein the narrowband control signal has a narrowband control signal frequency range and the transformed narrowband control signal frequency range is identical to the narrowband control signal frequency range.

12. The apparatus of claim 11, wherein the transformed analog signal frequency range is equal in width to the frequency range of the audio signal.

* * * * *